United States Patent
Chang

(10) Patent No.: US 7,671,936 B2
(45) Date of Patent: Mar. 2, 2010

(54) LIQUID CRYSTAL DISPLAY COMPRISING AT LEAST ONE LED AND A PCB AND A FRAME HAVING AN OPENING WITH A NARROW PORTION AND A BROAD PORTION ON A SIDE SURFACE OF THE FRAME AND BACKLIGHT MODULE HAVING THE SAME

(75) Inventor: Chih-Li Chang, Tai-Nan (TW)

(73) Assignee: HannStar Display Corp., Yang-Mei, Tao-Yuan Hsien (TW)

( * ) Notice: Subject to any disclaimer, the term of this patent is extended or adjusted under 35 U.S.C. 154(b) by 292 days.

(21) Appl. No.: 11/533,774

(22) Filed: Sep. 21, 2006

(65) Prior Publication Data

US 2008/0074580 A1    Mar. 27, 2008

(51) Int. Cl.
*G02F 1/1333* (2006.01)
*G02F 1/1335* (2006.01)
*G09F 13/04* (2006.01)
*F21V 7/04* (2006.01)

(52) U.S. Cl. .............................. 349/65; 349/58; 349/69; 362/97.2; 362/612; 362/632; 362/633

(58) Field of Classification Search .................. 349/65, 349/58–62; 362/97.2–97.3, 612–613, 632–633
See application file for complete search history.

(56) References Cited

U.S. PATENT DOCUMENTS

| | | | |
|---|---|---|---|
| 5,786,665 A * | 7/1998 | Ohtsuki et al. ............... | 313/512 |
| 6,930,737 B2 | 8/2005 | Weindorf et al. | |
| 7,360,941 B2 * | 4/2008 | Yoon et al. .................. | 362/632 |
| 2003/0223020 A1 * | 12/2003 | Lee .............................. | 349/58 |
| 2005/0157521 A1 | 7/2005 | Chen et al. | |
| 2006/0125981 A1 * | 6/2006 | Okuda ......................... | 349/110 |
| 2007/0046859 A1 * | 3/2007 | Huang et al. .................. | 349/65 |

* cited by examiner

*Primary Examiner*—Andrew Schechter
*Assistant Examiner*—Charles Chang
(74) *Attorney, Agent, or Firm*—Winston Hsu

(57) ABSTRACT

A liquid crystal display has a light guide plate, a liquid crystal panel disposed on the light guide plate, a frame having a compartment for containing the light guide plate and a frame wall having an opening and a light bar cavity, and a light bar buried in the light bar cavity via the opening.

22 Claims, 15 Drawing Sheets

LIQUID CRYSTAL DISPLAY COMPRISING AT LEAST ONE LED AND A PCB AND A FRAME HAVING AN OPENING WITH A NARROW PORTION AND A BROAD PORTION ON A SIDE SURFACE OF THE FRAME AND BACKLIGHT MODULE HAVING THE SAME

BACKGROUND OF THE INVENTION

1. Field of the Invention

The invention relates to a liquid crystal display (LCD) and a backlight module (BLM), and more particularly, to an LCD and a BLM with specially designed light source and assembly elements.

2. Description of the Prior Art

LCDs have been vigorous developed, whether in small-size or large-size applications. Because liquid crystal displays (LCD) have light weight, thinness, low energy requirements, no radiation, and other good qualities, they have become the main stream in the market. Therefore, LCDs are widely applied to various information devices, such as notebooks, mobile phones, digital cameras, or personal digital assistants (PDAs), and tend to replace conventional cathode ray tube (CRT) televisions, rear projection type televisions, or plasma display panel (PDP) televisions.

Since liquid crystal molecules do not produce light themselves, the BLM is one of the major components of an LCD. The traditional BLM uses cold cathode fluorescent lamp (CCFL) as a light source. FIG. 1 is a partial sectional-view of the BLM according to the prior art. The prior-art BLM 10 includes a light guide plate 14, a CCFL 12 positioned near the light guide plate 14, a reflector 16 below the light guide plate 14, several optical films 18 on the light guide plate 14, and a frame 20 for fixing the elements of the BLM 10. Since the CCFL 12 produces light from each sides of its tube, a light source reflector 22 has to be disposed near the CCFL 12 in order to reflect light back to the CCFL 12 or the light guide plate 14 so as to raise light utility. Furthermore, for avoiding light loss from the top side of the spacing between the light source reflector 22 and the optical films 18, a shadow tape 24 has to be disposed, covering the spacing of the light source reflector 22 and the optical films 18.

However, the CCFL light source has gradually not able to satisfy consumers' requirement because the LCD using the CCFL as a light source is limited in color specification improvement. In addition, a CCFL has mercury that does not meet green product requirements. In recent years, light emitting diodes (LEDs) have been applied to BLMs for serving as light sources. Because LEDs have the advantages of high color saturation, quick response, and small size, they are popular in small-size LCDs. However, technology of white LED producing saturated white light is not mature, and therefore red LED, green LED, and blue LED are used in a BLM at the same time in many cases. In this situation, good light mixing design for sufficiently mixing red, green, and blue lights is required. Therefore, LED BLMs have complicated mechanical structures and higher costs than conventional CCFL BLMs.

U.S. Pat. No. 6,930,737 and US published application No. 2005-0157521 have disclosed conventional LCD structures with LEDs as light sources. According to U.S. Pat. No. 6,930,737, with reference to FIG. 2, an LCD device 50 includes a housing 52, a frame 72, a liquid crystal panel 54, optical films 56, a light pipe 60, enhanced specular reflector (ESR) 70, a printed circuit board (PCB) 62, LED arrays 64, 66, an enhanced diffuser reflector 68, a LED controller circuit (not shown), and a circuit board (not shown). The optical films 56, light pipe 60, ESRs 70, PCB 62, LED arrays 64, 66, and enhanced diffuser reflector 68 contained in the frame 72 compose the BLM 58 of the LCD device 50. Noted that the frame 72 includes a front frame and a rear frame for fixing the BLM 58, wherein the LED arrays 64, 66 are positioned at two sides of the BLM 58 so that light produced from the LEDs may penetrate into the light pipe 60 through its sidewalls. For avoiding light leak, the ESRs 70 have to be set for fixing the LED arrays 64, 66 near the light pipe 60 and reflecting light, with large emitting angles, back into the light pipe 60 in order to raise light utility. Accordingly, lots of assembly components are used to compose the LCD 58 for fixing all the optical elements and providing a preferable performance. Therefore, to assemble the LCD device 50 or BLM 58 shown in FIG. 2 is complicated and needs a lot of time.

As a result, to provide an improved BLM or LCD device that has good light source performance and a simple structure for simplifying the assembly process is still an important issue for the manufacturers.

SUMMARY OF THE INVENTION

It is therefore a primary objective of the claimed invention to provide a liquid crystal display and a backlight module to solve the above-mentioned problem.

According to the claimed invention, the liquid crystal display comprises a light guide plate, a liquid crystal panel disposed on the light guide plate, a frame with a frame wall and a compartment for containing the light guide plate, and a light bar. The frame wall has an opening and a light bar cavity, and the light bar is buried in the light bar cavity.

Accordingly, the light bar is buried in the light bar cavity of the frame. Therefore, the claimed invention provides at least four advantages: (a) Cost down: Extra shadow tape or light source reflector in the prior art are not needed anymore; (b) Easy assembly: plug-and-play light bar can be simply assembled on the frame so that labor power is saved; (c) Economy space design: narrow fringe of the LCD or BLM can be provided because the light bar is buried in the frame wall of the frame; and (d) High light utility: both the light source on the light bar and the light guide plate are positioned in the frame side by side such that all light produced from the light source may directly penetrate into the light guide plate without light loss.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
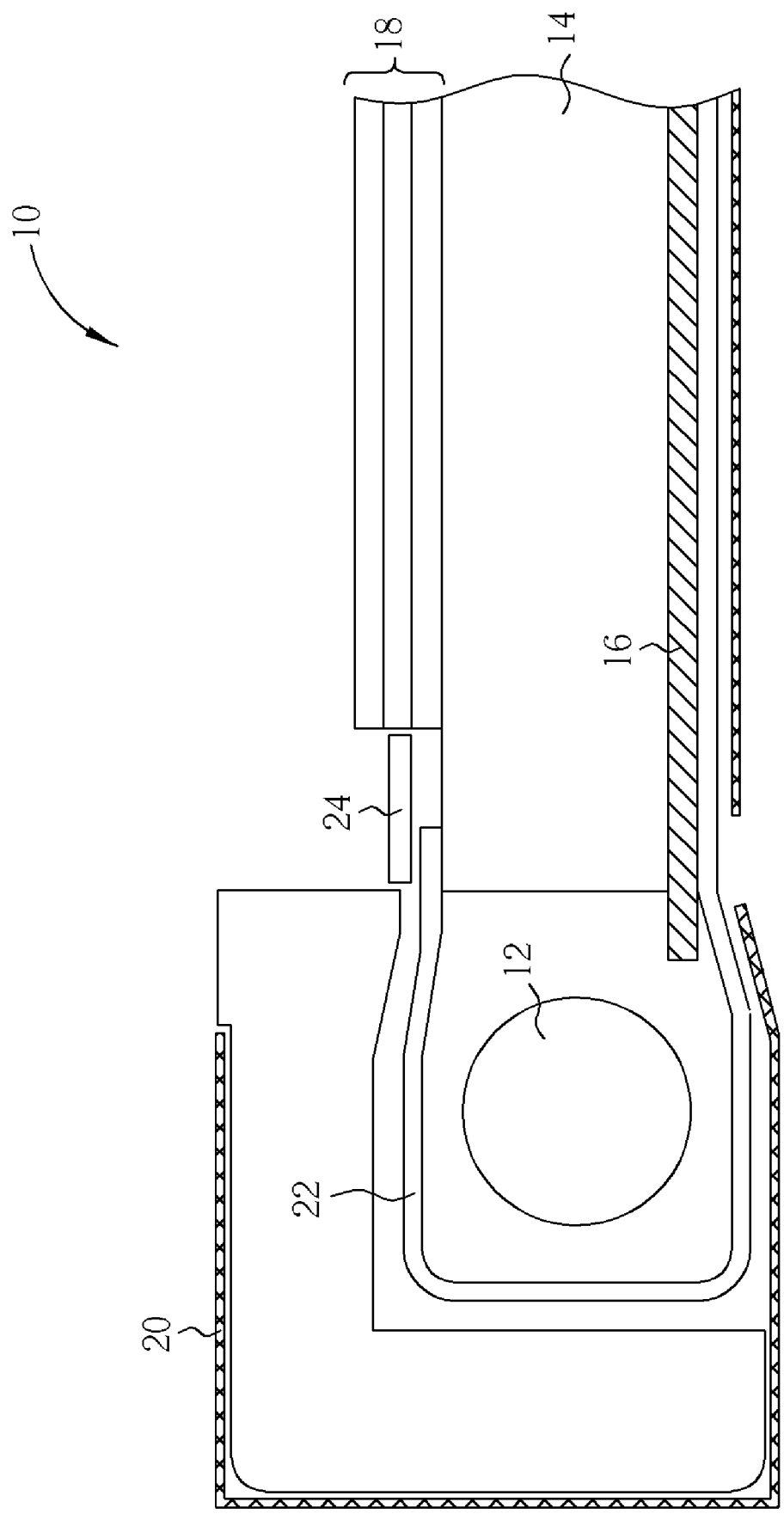
FIG. 1 is a partial sectional-view of a BLM according to the prior art.
Figure 2:
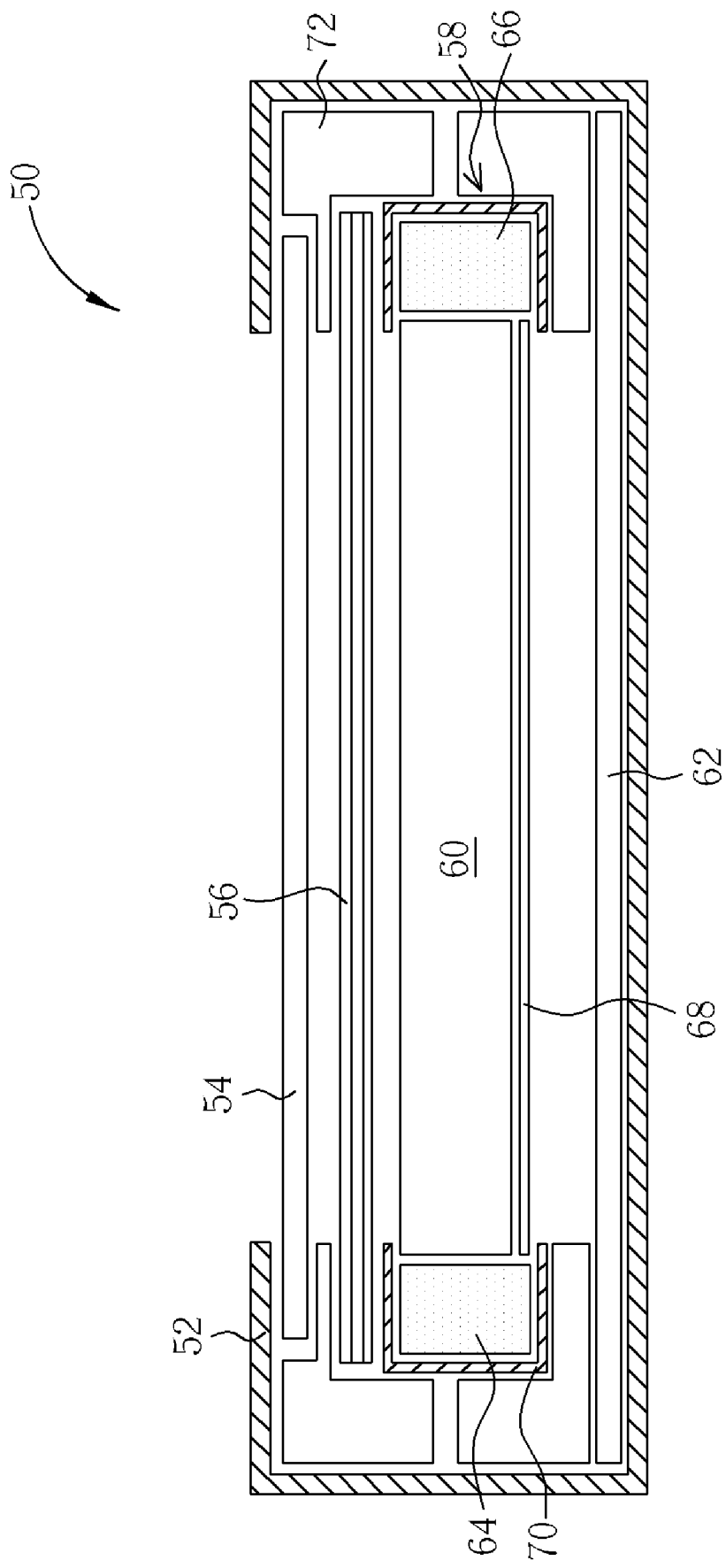
FIG. 2 is a schematic sectional-view of a BLM with LEDs as light source according to the prior art.
Figure 3:
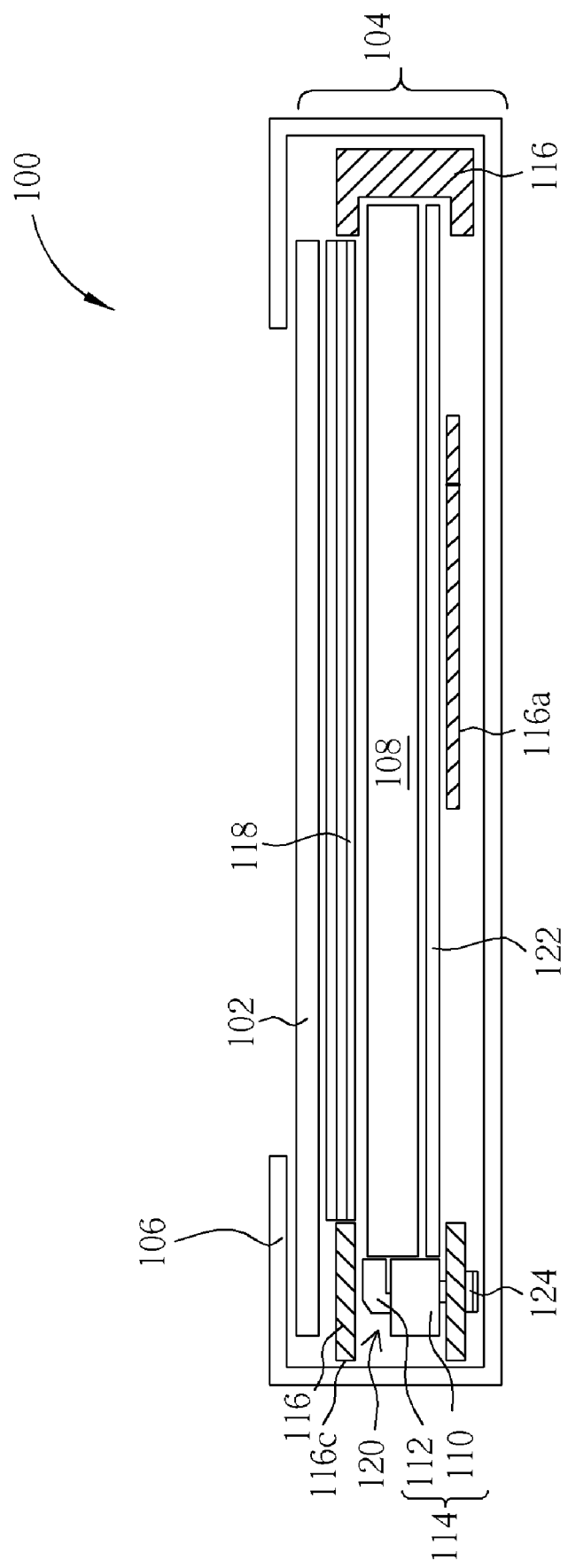
FIG. 3 is a section-view schematic diagram of an LCD 100 according to a first embodiment of the present invention.
Figure 4:
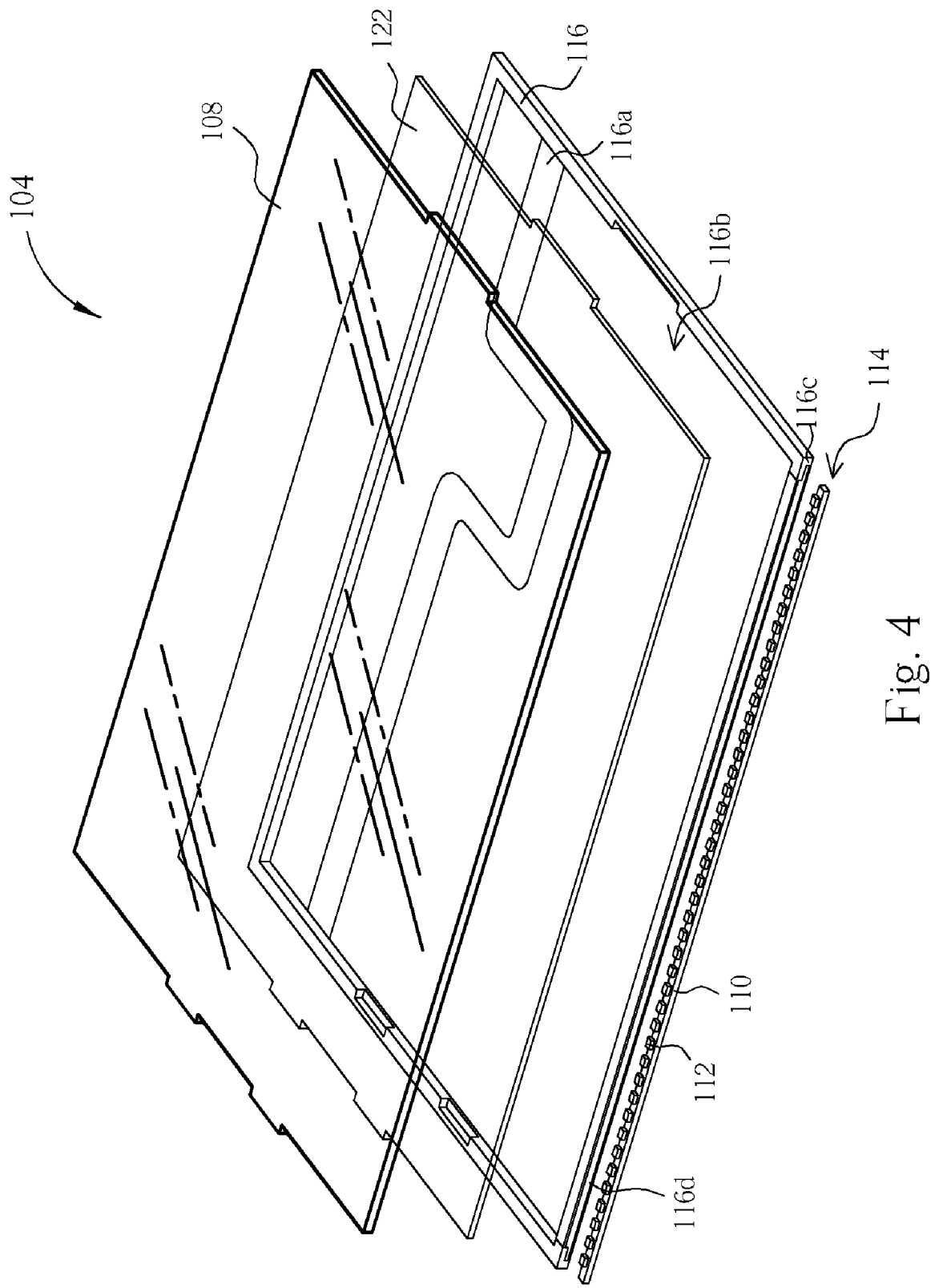
FIG. 4 is an explosive view of the LCM shown in FIG. 3.
Figure 5:
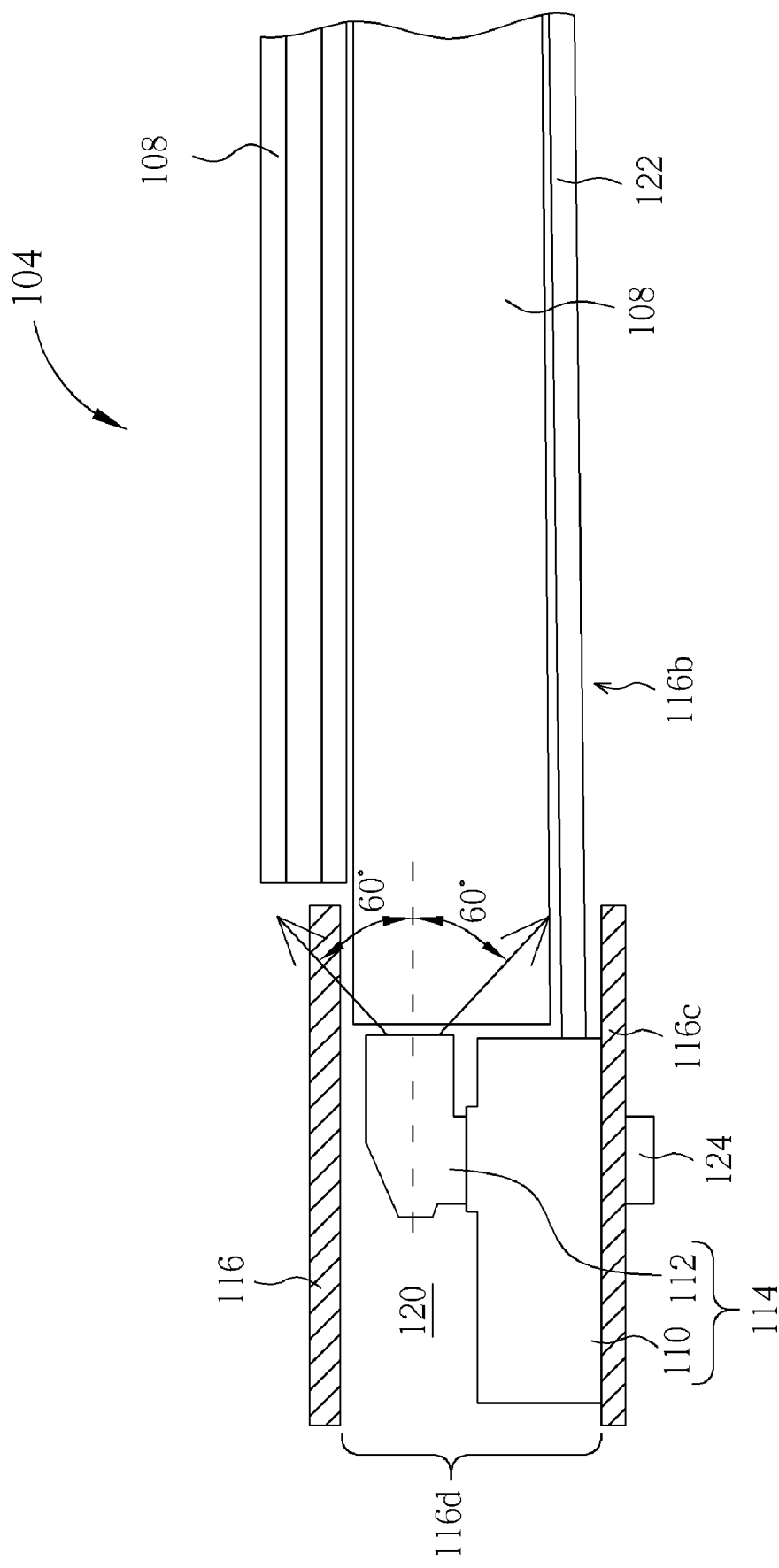
FIG. 5-6 are enlarged views of a portion of the BLM shown in FIG. 3.
Figure 6:
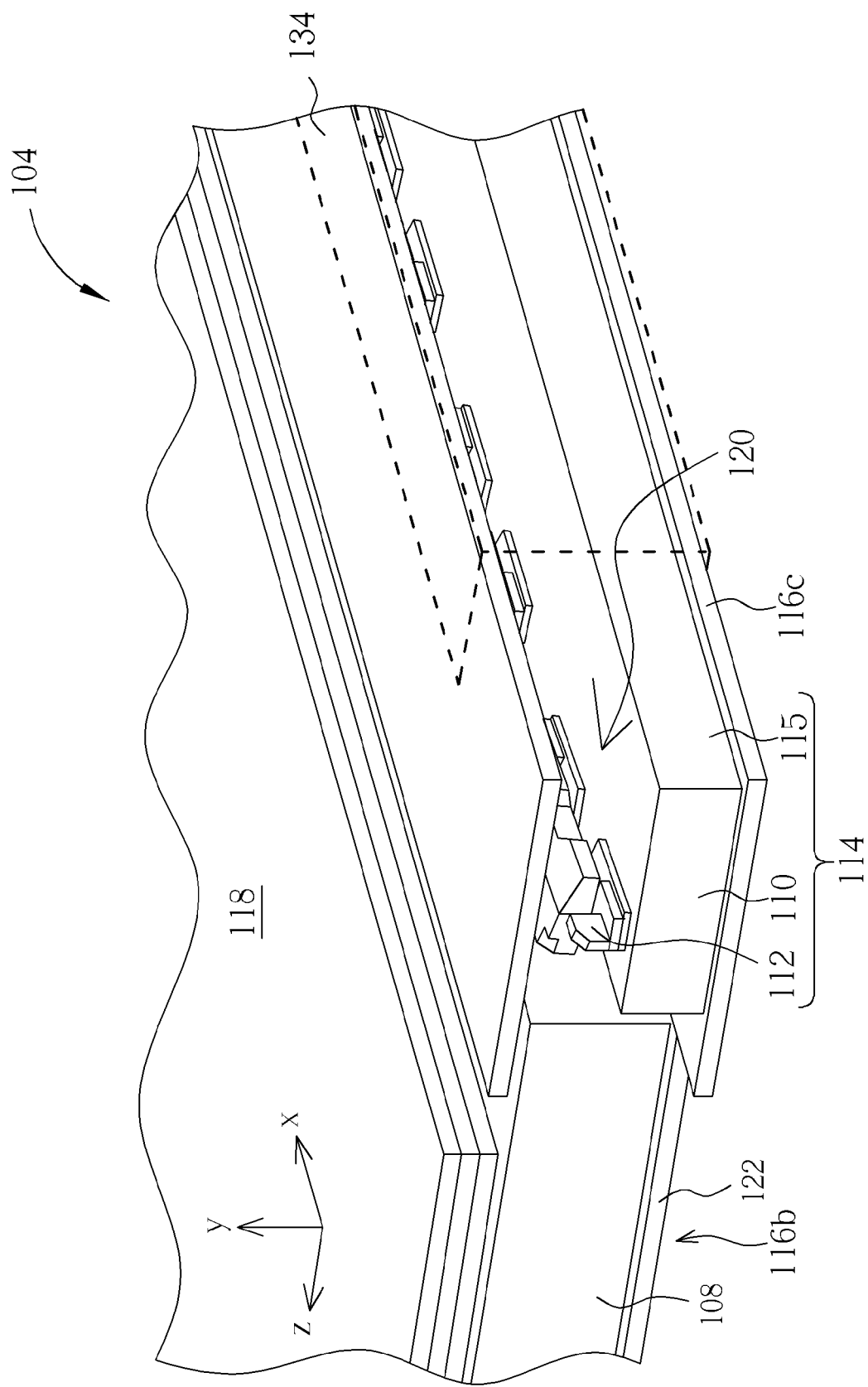
Figure 7A:
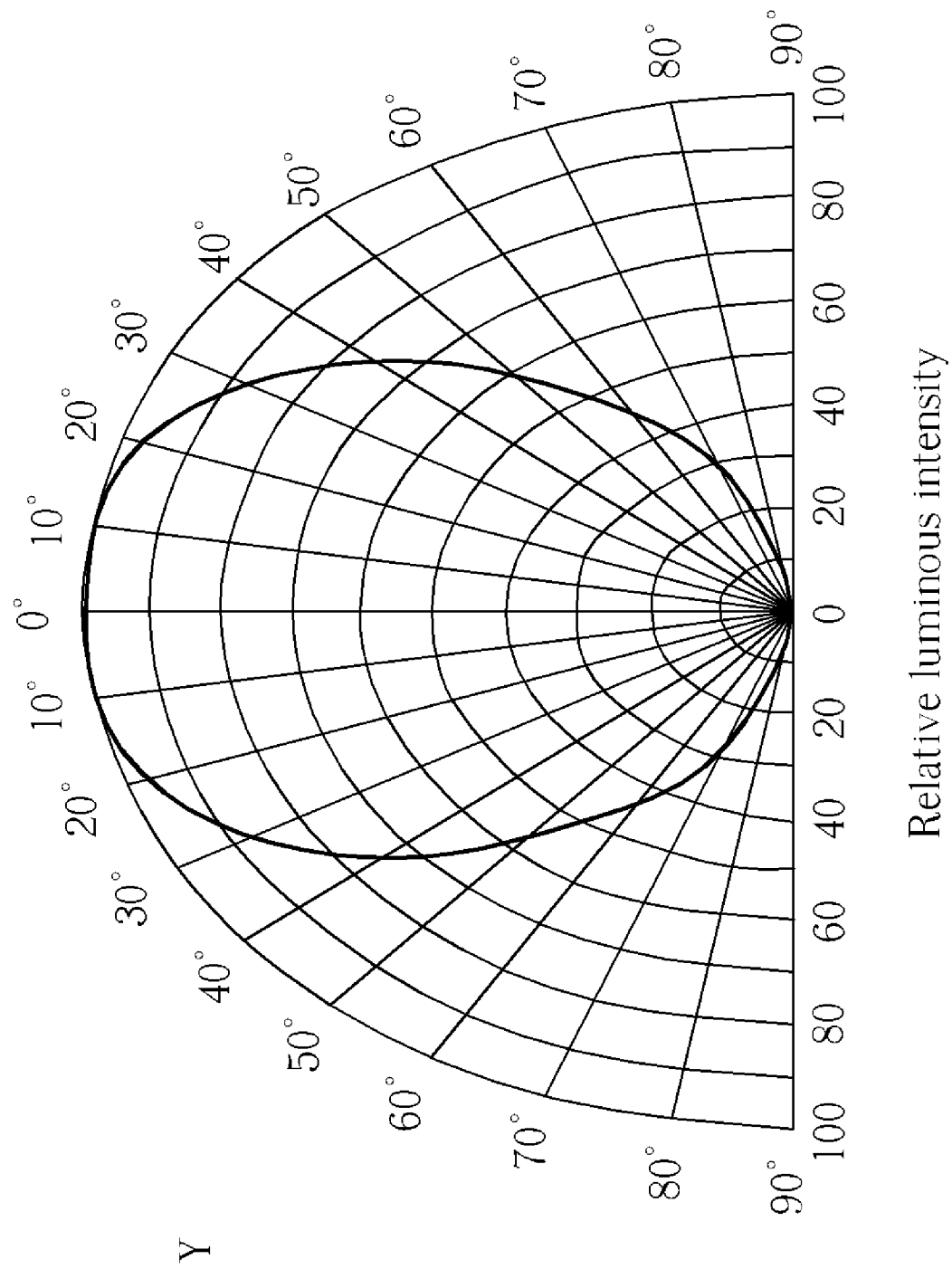
FIGS. 7a-7b are directive characteristics diagrams of the LEDs shown in FIG. 3.
Figure 7B:
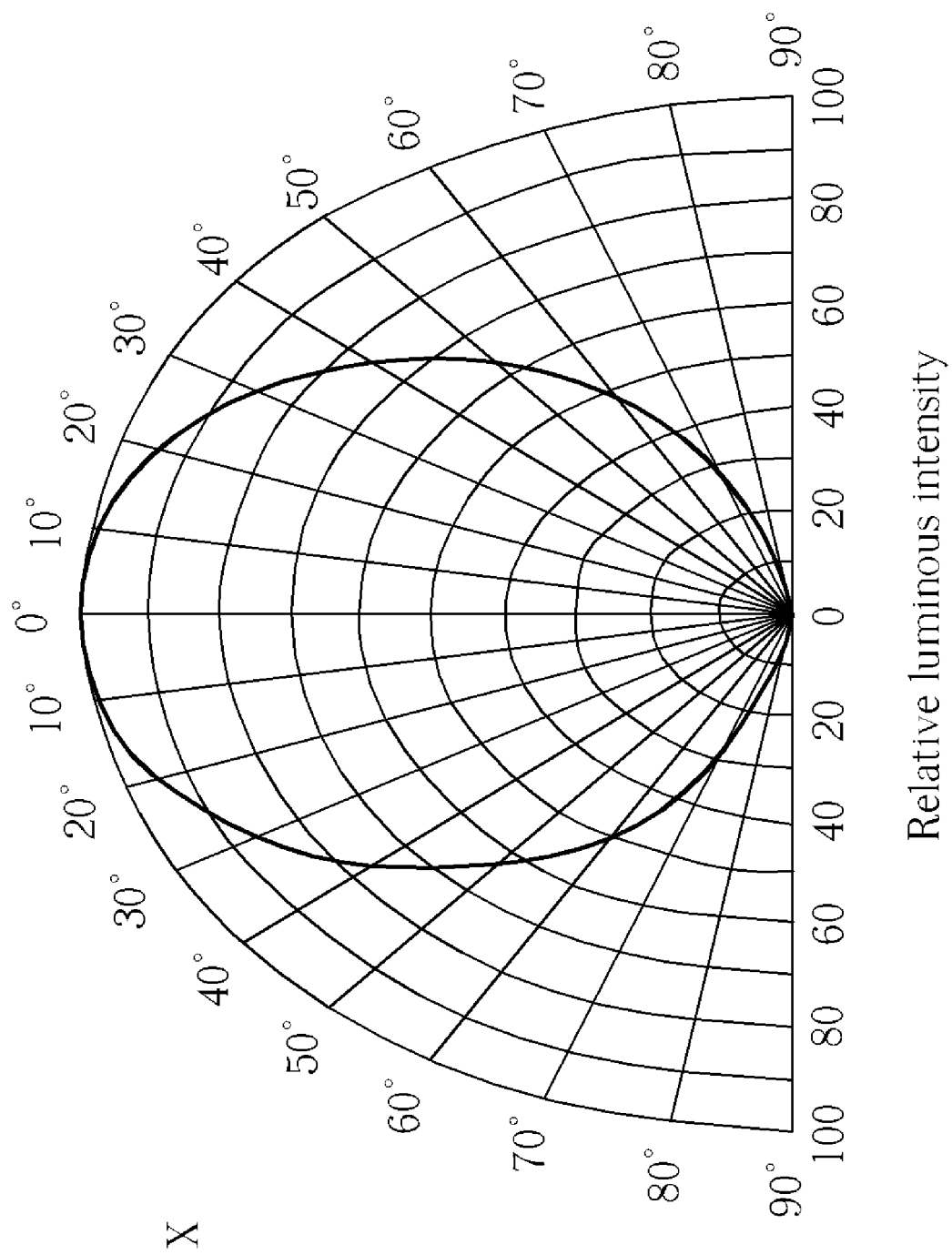

FIG. 3 is a section-view schematic diagram of an LCD 100 according to a first embodiment of the present invention, and FIG. 4 is the LCM 104 shown in FIG. 3. The present invention LCD 100 comprises a liquid crystal panel 102 and an LCM 104, which are fixed in a housing 106 to compose the LCD 100. The LCM 104 comprises a frame 116 having frame walls 116c and a compartment 116b, a light guide plate 108 disposed in the compartment 116b, a reflector 122 positioned below the light guide plate 108, and a light bar 114 plugged in one of the frame walls 116c and positioned near the light guide plate 108.

Clearly, the frame 116 is a monolithically-formed structure, and has four frame walls 116c forming the compartment 116b and a fixing strip 116a so that the light guide plate 108 and the reflector 122 are positioned and fixed in the compartment 116b, on the fixing strip 116a. The frame 116 is composed of materials with high reflectivity, such as white materials or light-color plastic materials for reflecting light. On the other hand, the frame 116 may also be formed with black materials for avoiding light leak. In addition, the frame wall 116c of the frame 116 for setting the light bar 114 has an opening 116d forming a light bar cavity 120 in the frame wall 116c so that the light bar 114 can be plugged into the light bar cavity 120 through the opening 116d to be disposed near the light guide bar 108. The light bar 114 is a plug-and-play light bar, comprising a substrate or a printed circuit board (PCB) 110 and a plurality of light sources or LEDs 112 positioned on the PCB 110, wherein the LEDs 112 are white side-view type LEDs preferably.

The reflector 122 positioned below the light guide plate 108 is used to reflect light emitted from the bottom surface of the light guide plate 108. In order to stably fix the light bar 114 in the frame wall 116c, at least a screw 124 may be used to lock the light bar 114 through screw holes on the PCB 110 from the bottom-side of the frame 116. In addition, for providing good performance of a plane light source, the BLM 104 may further comprises a plurality of optical films 118 on the light guide plate 108, such as diffuser or prism sheets. The optical films 118 may be positioned near the frame walls 116c or in the compartment 116b.

Referring to FIGS. 5-6 and FIGS. 7a-7b, enlarged views of the BLM 104 are shown and directive characteristics of the LEDs 112 are provided. An outer side 115 of the light bar 114 is not shielded by the frame wall 116c, that is, the outer side of the light bar 114 is exposed from the frame 116. Since the light bar 114 are buried in the frame wall 116c near the compartment 116b containing the light guide plate 108, the light-emitting surfaces of the LEDs 112 are quite near the light guide plate 108, such that light produced from the LEDs 112 directly penetrates through the sidewall of the light guide plate 108 to provide a plane light source. According to FIGS. 7a-7b, the relative luminous intensity of the emitting angle larger than 80 degrees of an LED 112 approaches to 0, whether for the x-axis or the y-axis of the LED 112. In addition, the relative luminous intensity of the emitting angle larger than 60 degrees is less than 50. Therefore, the side-view LEDs 112 applied to the present invention have a divergence angle is about ±80 degrees, preferably about ±60 degrees, which means the total divergence angle of each LED 112 is 120 degrees. Since the LEDs 112 have directive characteristics, light source reflector used in the prior art is not needed anymore for the present invention. Furthermore, since the divergence angle is not large, extra shadow tape in a conventional BLM may be omitted because less light emitting form the LED 112 with large emitting angles. Even when light emits from the LED 112 with large angles without directly penetrating into the light guide plate 108, the frame 116 is capable of blocking light emitting out from the BLM 104. For example, if the frame 116 is formed with white materials, light penetrating to the frame 116 above the LEDs 112 will be reflected back to the light guide plate 108 so as to raise light utility. On the other hand, if the frame 116 is formed with black materials, light emitting to the frame 116 above the LEDs 112 will be absorbed by the frame 116 to prevent light leak. As a result, extra light source reflector or shadow tape is not needed, thus the assembly process is simplified and raw materials can be saved.

Figure 8:
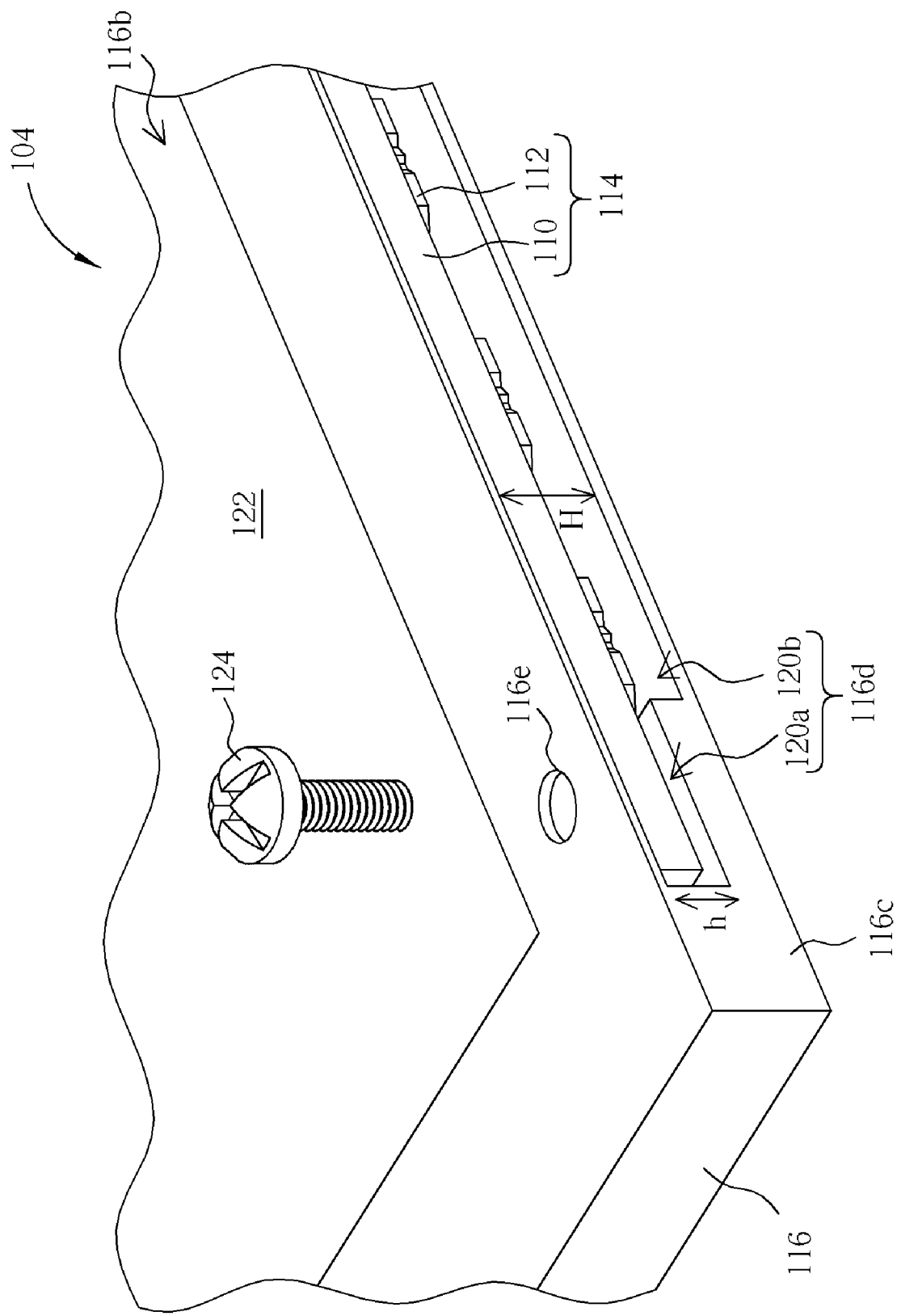
FIGS. 8-9 are partial enlarged views of the BLM shown in FIG. 4.
Figure 9:
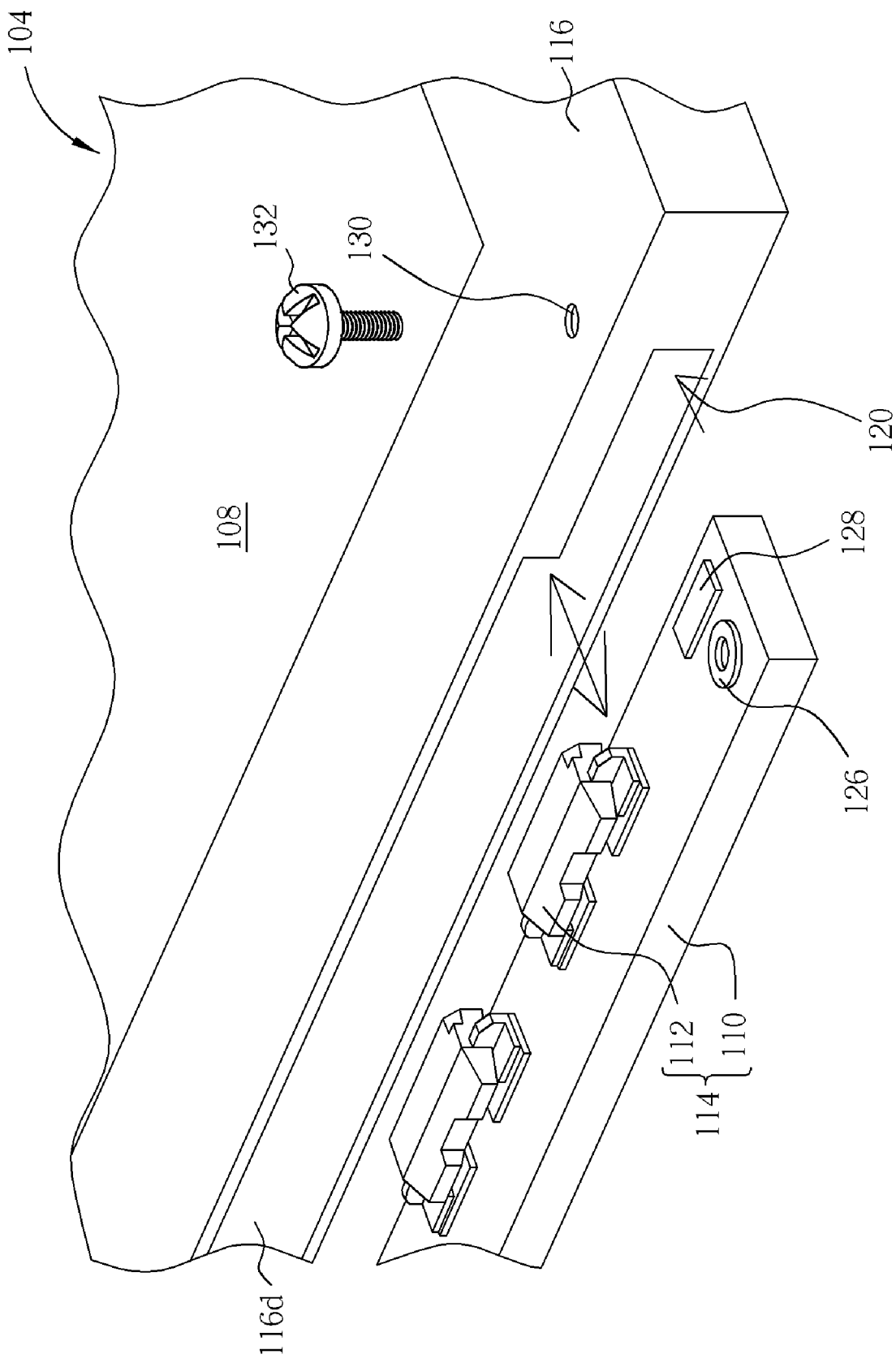
Figure 10:
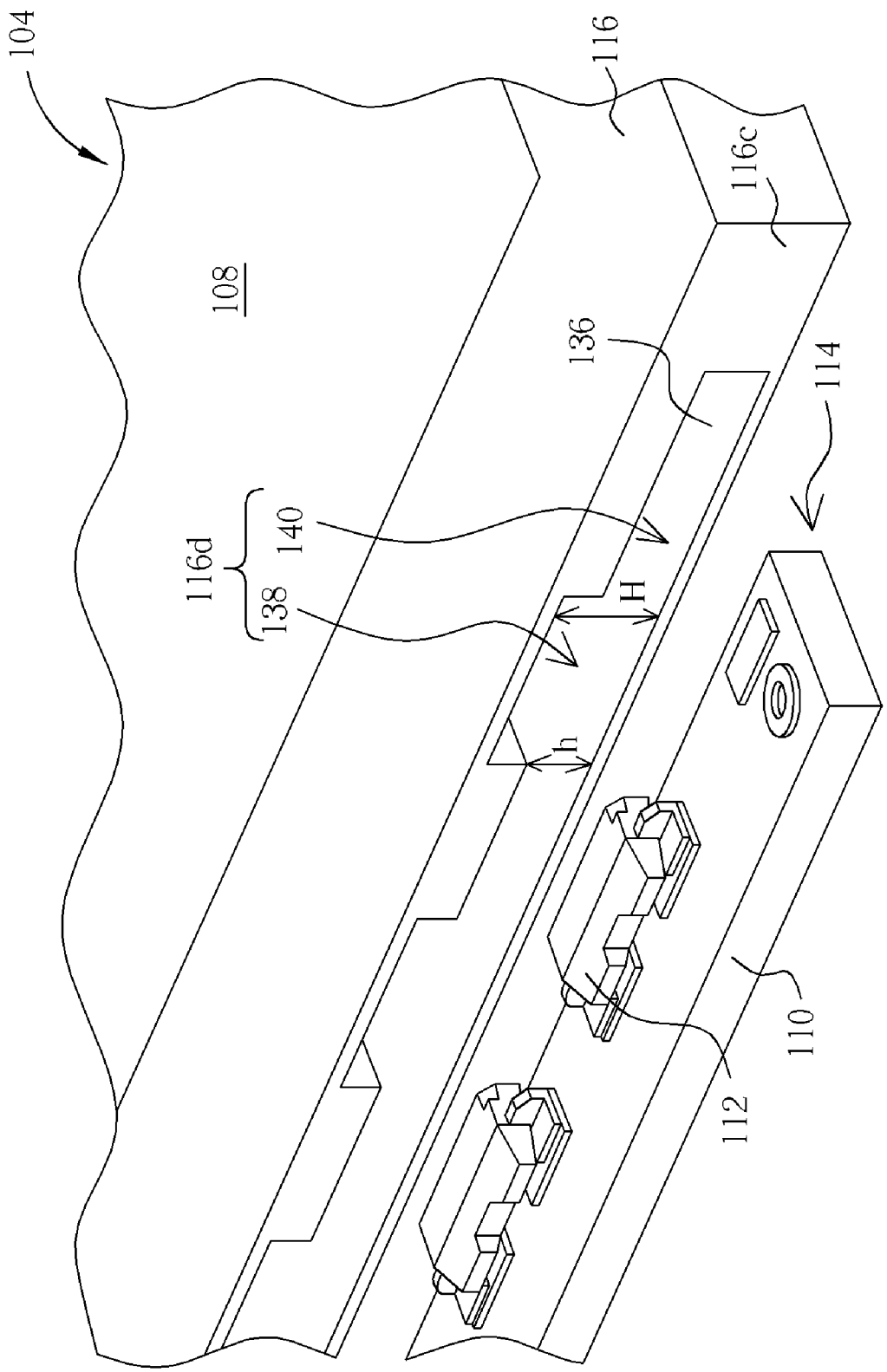
FIG. 10 is a partial schematic diagram of a frame and a light bar of a BLM according to a second embodiment of the present invention.

With reference to FIGS. 8-9, partial-enlarged views of the BLM 104 are illustrated. FIG. 8 shows the rear side of the BLM 104, wherein the reflector 122 is positioned in the compartment 116b of the frame 116. The screw 124 is used for lock the light bar 114 in the light bar cavity 120 through a screw hole 116e on the frame 116, from the rear side. It should be noted that the opening 116d comprises two narrow portions 120a and a broad portion 120b between the narrow portions 120a (as shown in FIG. 4). For containing the light bar 114, the heights h of the narrow portions 120a is approximately the same as or a little bigger than the thickness of the PCB 110, while the height H of the broad portion 120b is approximately the same as or a little bigger than the total thickness of the PCB 110 and the LED 112.

On the other hand, FIG. 9 shows the front side of the BLM 104. In various embodiments, a screw 132 may be used for fixing the light bar 114 through the screw hole 130 of the frame 116 from the front side of the BLM 104. Correspondingly, a screw hole 126 may be disposed on the PCB 110 for accepting the screw 132. In addition, since the light bar 114 is a plug-and-play light bar, at least a conductive pad 128 is positioned on the PCB 110. Therefore, after the light bar 114 is plugged into the light bar cavity 120, the conductive pad 128 is electrically connected to a conductive wire (not shown), which may be disposed in the frame 116, or to a flexible printed circuit (not shown).

FIGS. 10-15 are partial schematic diagrams of the BLM 104 according to various embodiments of the present invention, wherein most elements have the same numerals shown in FIG. 3-9 for simplifying explanation. Please refer to FIG. 10, which illustrates a second embodiment of the present invention. The frame wall 116c of the frame 116 has an opening 116d forming a light bar cavity 136 in the frame wall 116c, and the opening 116d comprises a plurality of narrow portions 140 and a plurality of broad portions 138 alternately disposed. For containing the light bar 114, the height h of the narrow portions 140 is approximately the same as or a little bigger than the thickness of the PCB 110 of the light bar 114, while the height H of the broad portions 138 is approximately the same as or a little bigger than the total thickness of the PCB 110 and one of the LEDs 112. Therefore, when the light bar 114 is plugged into the light bar cavity 136, it will be stably fixed therein without horizontal shift. Preferably, the width of the broad portions 138 is approximately the same as or a little bigger than the width of LEDs 112.

Figure 11:
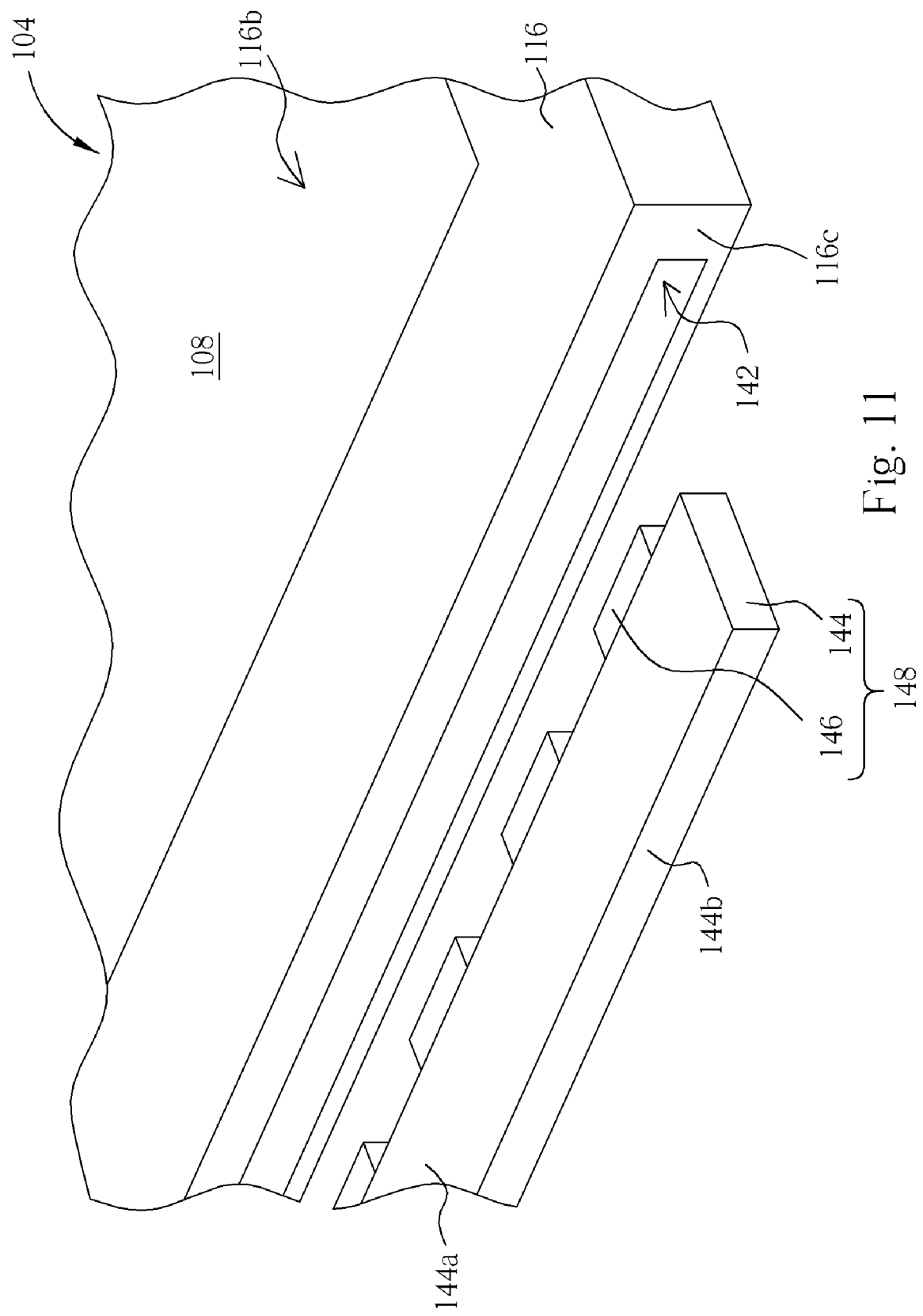
FIG. 11 is a partial schematic diagram of a frame and a light bar of a BLM according to a third embodiment of the present invention.

Referring to FIG. 11, FIG. 11 is a schematic diagram of a frame 116 and a light bar 148 of the LCM 104 according to a third embodiment of the present invention. In this embodiment, the plug-and-play light bar 148 comprises a PCB 144 and a plurality of LEDs 146 set on the PCB 144, wherein the PCB 144 has at least a broad surface 144a parallel to the light guide plate which will be positioned in the compartment 116b and at least a narrow surface 144b parallel to the frame wall 116c. It should be noted that the LEDs 146 are disposed on the narrow surface 144b so that the total thickness of the light bar 148 is smaller than those in the above-mentioned embodiments. Accordingly, the height of the opening 142 on the frame wall 116c can be smaller and approximately the same as the thickness of the PCB 144, that is, the height of the opening 142 is equal to or larger than the thickness of the light bar 148.

Figure 12:
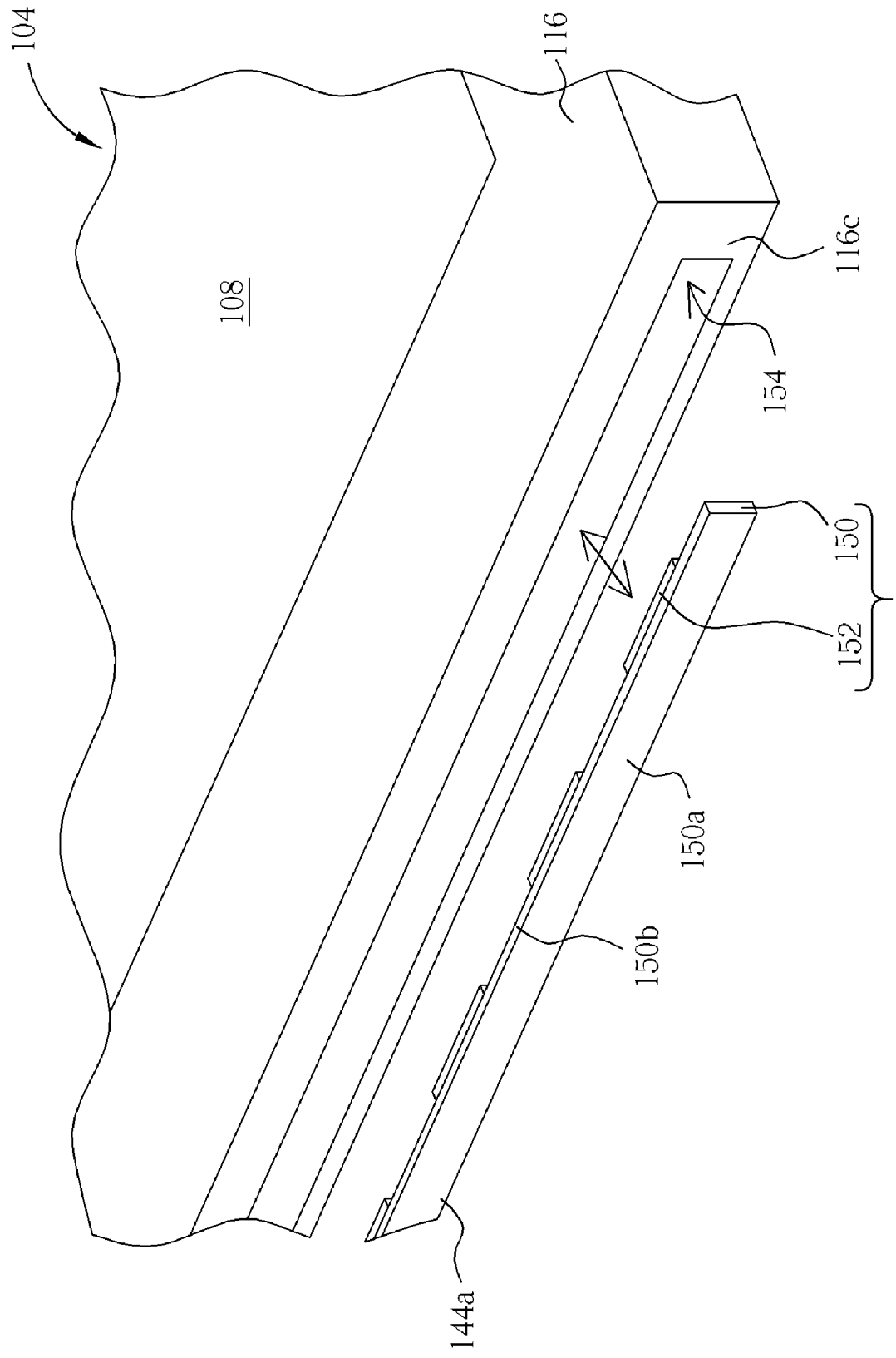
FIGS. 12-13 are partial schematic diagrams of a frame and a light bar of a BLM according to a fourth embodiment of the present invention.
Figure 13:
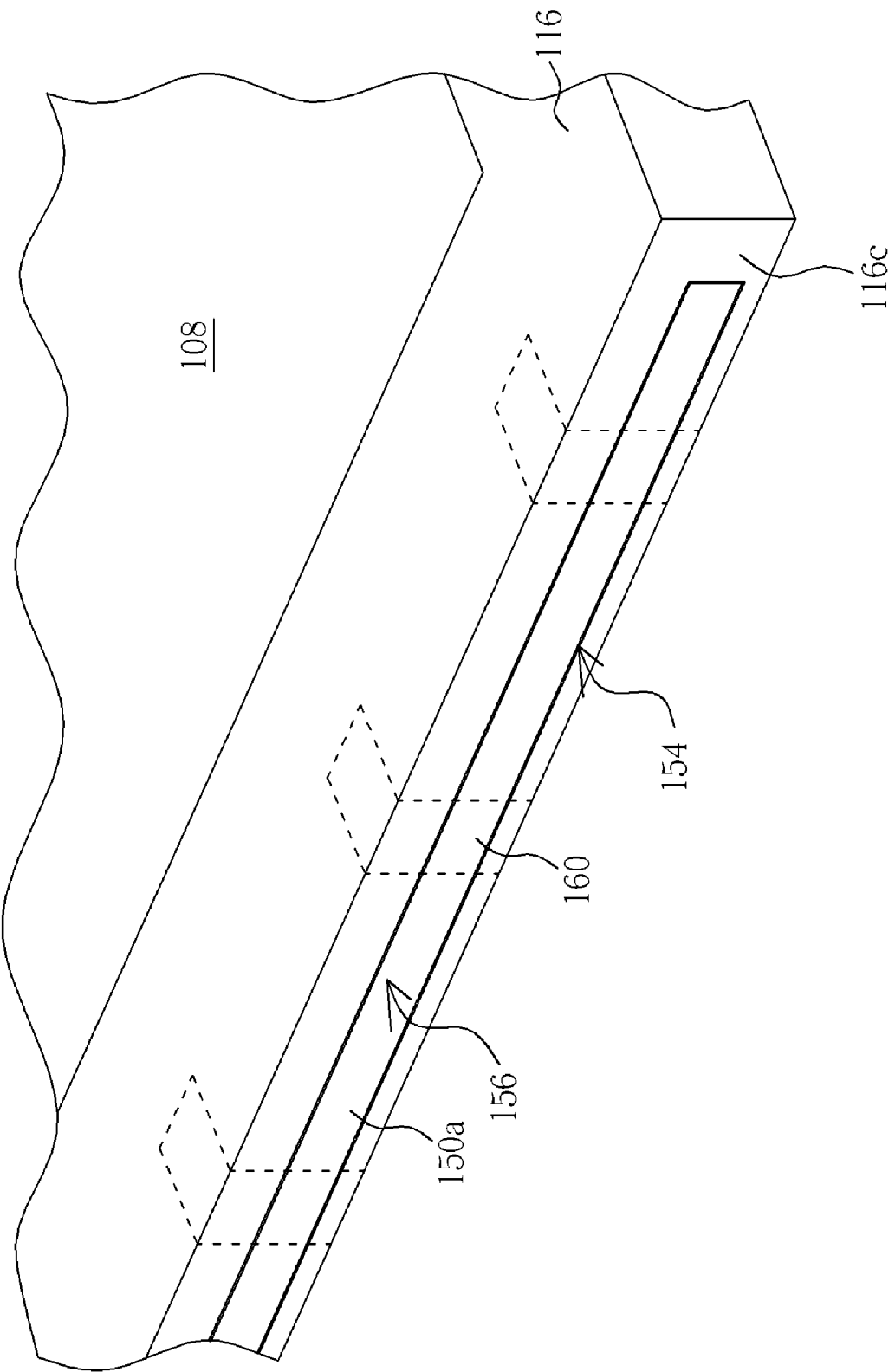

FIGS. 12-13 are schematic diagrams of a frame 116 and a light bar 156 of the LCM 104 according to a fourth embodiment of the present invention. In this embodiment, top-view LEDs 152 are utilized to form the light bar 156. The plug-and-play light bar 156 comprises a PCB 150 for positioning the LEDs 152, which has two broad surfaces 150a and two narrow surfaces 150b. Since the LEDs 152 are top-view types, they are set on one of the broad surfaces 150a of the PCB 150 facing the light guide plate 108. As a result, when the light bar 156 is plugged in the light bar cavity 154, the broad surface 150a where the LEDs 152 are not positioned is parallel to the frame wall 116c, and the height of the light bar cavity 154 is almost the same as the width of the broad surface 150a of the PCB 150, as shown in FIG. 13. In addition, for fixing the light bar 156 in the light bar cavity 154, several narrow tapes 160 or a broad tape (not shown) may be used to adhere the PCB 150 to the frame wall 116c.

Figure 14:
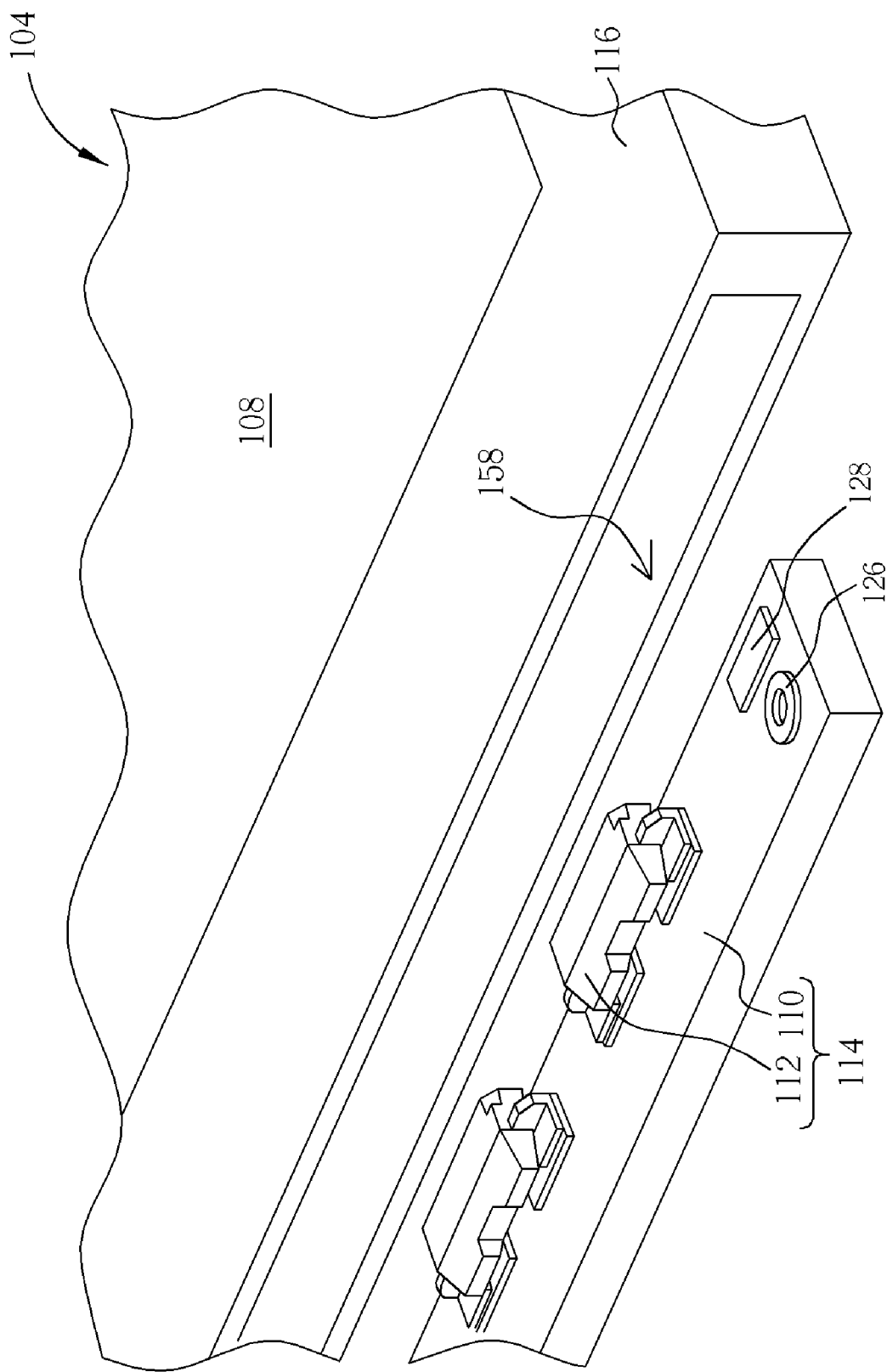
FIG. 14 is a partial schematic diagram of a frame and a light bar of a BLM according to a fifth embodiment of the present invention.

FIG. 14 shows the frame and the light bar of the LCM according to a fifth embodiment of the present invention. The light bar 114 used in this embodiment may be the same as that in the first embodiment of the present invention, wherein the light bar 114 comprises a PCB 110, a plurality of side-view LEDs 112, a screw hole or an orientation hole 126 and a conductive pad 128 positioned on the PCB 110. It should be noted that the opening 158 of the frame 116, which forms a light bar cavity, is a rectangular opening. Therefore, the height of the opening 158 is approximately the same as or a little bigger than the total thickness of one LED 112 and the PCB 110.

It is an advantage of the present invention that the plug-and-play light bar is positioned in the light bar cavity so that extra shadow tape or light source reflector in the prior art are not needed anymore. Furthermore, the light source is provided as a plug-and-play type light source and the frame of the BLM is a monolithically-formed structure. Accordingly, raw materials of the frame is lowered, and it is simple and easy to assemble the backlight module by plugging the plug-and-play light bar into the light bar cavity. As a result, the labor power for assembling the backlight module is saved. In addition, since the light bar is buried in the frame wall of the frame, the whole BLM may have narrow fringe for positioning the light source. On the other hand, the light bar burred in the frame wall is nearly positioned next to the light guide bar, and therefore light produced from the light source may directly penetrate into the light guide plate, resulted in less light loss.

To sum up, in contrast to the prior art, the present invention LCD or BLM have at least the advantages of cost down, easy assembly, economic space design, and high light utility. Therefore, the LCDs and BLMs with simple structures and good performance are provided according to the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A liquid crystal display, comprising:
   a light guide plate having a light introducing surface;
   a frame having a compartment for containing the light guide plate, an opening with a narrow portion and a broad portion simultaneously disposed on a side surface of the frame, and a light bar cavity;
   a liquid crystal panel disposed above the frame; and
   a light bar having at least one light emitting diode (LED) and a print circuit board (PCB) buried in the light bar cavity via the opening;
   wherein the side surface of the frame is substantially parallel to the light introducing surface, and a light emitting surface of the LED is substantially parallel to the light introducing surface.

2. The liquid crystal display of claim 1, wherein the light bar comprises a substrate and a light source positioned on a surface of the substrate.

3. The liquid crystal display of claim 2, wherein the surface faces the light guide plate.

4. The liquid crystal display of claim 2, wherein the substrate is a printed circuit board.

5. The liquid crystal display of claim 2, wherein the substrate comprises a conductive pad.

6. The liquid crystal display of claim 2, wherein the substrate has a hole.

7. The liquid crystal display of claim 2, wherein the light source is a light emitting diode.

8. The liquid crystal display of claim 7, wherein the light emitting diode is a side-view light emitting diode, a top-view light emitting diode, or a white light emitting diode.

9. The liquid crystal display of claim 1, wherein a height of the narrow portion is equal to or larger than a thickness of the substrate.

10. The liquid crystal display of claim 1, wherein a height of the broad portion is equal to or larger than a thickness of the substrate and the light source.

11. The liquid crystal display of claim 1, wherein a width of the broad portions is equal to or larger than the width of light source.

12. The liquid crystal display of claim 2, wherein the divergence angle of the light source is ±80 degrees.

13. The liquid crystal display of claim 12, wherein the divergence angle of the light source is ±60 degrees.

14. The liquid crystal display of claim 1, wherein a height of the opening is equal to or larger than the thickness of the light bar.

15. The liquid crystal display of claim 1, wherein the frame is composed of materials with high reflectivity material or white material.

16. The liquid crystal display of claim 1, wherein the frame is composed of light absorbed material or black material.

17. The liquid crystal display of claim 1, further comprises a screw securing the light bar.

18. The liquid crystal display of claim 1, further comprises a tape securing the light bar.

19. The liquid crystal display of claim 1, wherein the frame comprises a fixing strip supporting the light guide plate.

20. The liquid crystal display of claim 1, wherein the frame further comprises a plurality of narrow portions, and the narrow portions and the broad portion are alternately arranged on the side surface of the frame.

21. A backlight module, comprising:

a light guide plate having a light introducing surface;

a frame having a compartment for containing the light guide plate, an opening with a narrow portion and a broad portion simultaneously disposed on a side surface of the frame, and a light bar cavity; and a light bar having at least one light emitting diode (LED) and a print circuit board (PCB) buried in the light bar cavity via the opening, wherein the side surface of the frame is substantially parallel to the light introducing surface, and a light emitting surface of the LED is substantially parallel to the light introducing surface.

22. The back light module of claim 21, wherein the frame further comprises a plurality of narrow portions, and the narrow portions and the broad portion are alternately arranged on the side surface of the frame.

* * * * *